United States Patent
Piefer (10) Patent No.: US 9,024,261 B2
(45) Date of Patent: May 5, 2015

(54) METHOD AND APPARATUS FOR PERFORMING ACTIVE NEUTRON INTERROGATION OF CONTAINTERS

(75) Inventor: Gregory Piefer, Middleton, WI (US)

(73) Assignee: Phoenix Nuclear Labs LLC, Middleton, WI (US)

( * ) Notice: Subject to any disclaimer, the term of this patent is extended or adjusted under 35 U.S.C. 154(b) by 0 days.

(21) Appl. No.: 13/515,487

(22) PCT Filed: Dec. 14, 2010

(86) PCT No.: PCT/US2010/060318
§ 371 (c)(1),
(2), (4) Date: Jul. 26, 2012

(87) PCT Pub. No.: WO2011/081940
PCT Pub. Date: Jul. 7, 2011

(65) Prior Publication Data
US 2012/0286164 A1 Nov. 15, 2012

Related U.S. Application Data

(60) Provisional application No. 61/286,690, filed on Dec. 15, 2009.

(51) Int. Cl.
*G01N 23/05* (2006.01)
*H05H 3/06* (2006.01)
*G01V 5/00* (2006.01)

(52) U.S. Cl.
CPC ............... *H05H 3/06* (2013.01); *G01V 5/0091* (2013.01)

(58) Field of Classification Search
CPC .................. G21G 1/10; G01N 23/05
USPC ...................................................... 250/358.1
See application file for complete search history.

(56) References Cited

U.S. PATENT DOCUMENTS

| 3,473,056 A | 10/1969 | Ferry |
| 3,571,734 A | 3/1971 | Consoli et al. |
| 3,676,672 A | 7/1972 | Meckel et al. |
| 4,008,411 A | 2/1977 | Brugger et al. |
| 4,497,768 A | 2/1985 | Caldwell et al. |

(Continued)

FOREIGN PATENT DOCUMENTS

| JP | 02-156200 | 6/1990 |
| JP | 04-504472 A | 8/1992 |

(Continued)

OTHER PUBLICATIONS

Written Opinion for International Application No. PCT/US2010/060318, mail date Feb. 28, 2011, 6 pages.

(Continued)

*Primary Examiner* — Marcus Taningco
(74) *Attorney, Agent, or Firm* — Foley & Lardner LLP (57) ABSTRACT

An apparatus for inspecting the contents of a cargo container includes a neutron source having an ion source configured to provide deuterium or tritium ions and an accelerator configured to accelerate the ions toward a target having at least one of deuterium or tritium. The apparatus further includes a radiation detector where the neutron source is configured to deliver a neutron flux into the container and the radiation detector is configured to detect radiation exiting the container subsequent to the delivery of the neutron flux into the container.

24 Claims, 8 Drawing Sheets

(56) References Cited

U.S. PATENT DOCUMENTS

| | | |
|---|---|---|
| 5,135,704 A | 8/1992 | Shefer et al. |
| 5,200,626 A | 4/1993 | Schultz et al. |
| 5,481,105 A | 1/1996 | Gold |
| 5,838,759 A | 11/1998 | Armistead |
| 5,973,328 A | 10/1999 | Hiller et al. |
| 6,122,921 A | 9/2000 | Brezoczky et al. |
| 2002/0171042 A1 | 11/2002 | Chen et al. |
| 2003/0152185 A1 | 8/2003 | Catalasan |
| 2003/0152186 A1 | 8/2003 | Jurczyk et al. |
| 2003/0165213 A1 | 9/2003 | Maglich |
| 2003/0201394 A1 | 10/2003 | Peoples |
| 2005/0061994 A1 | 3/2005 | Amini |
| 2005/0220247 A1 | 10/2005 | Ruddy et al. |
| 2006/0163487 A1* | 7/2006 | Ambrosi et al. .......... 250/390.01 |
| 2008/0002810 A1 | 1/2008 | Slaughter et al. |
| 2008/0240329 A1 | 10/2008 | Norman et al. |
| 2009/0262882 A1 | 10/2009 | Perticone et al. |
| 2009/0302231 A1 | 12/2009 | McGregor et al. |
| 2010/0284502 A1 | 11/2010 | Piefer |
| 2010/0294943 A1 | 11/2010 | Frank |
| 2012/0286164 A1* | 11/2012 | Piefer .................. 250/358.1 |

FOREIGN PATENT DOCUMENTS

| | | |
|---|---|---|
| JP | 07-249498 | 9/1995 |
| JP | 2003-513418 | 4/2003 |
| JP | 3969663 | 9/2007 |
| WO | WO-01/31678 | 5/2001 |
| WO | WO 2008/012360 | 1/2008 |
| WO | WO-2009/135163 | 11/2009 |
| WO | WO-2009/142669 | 11/2009 |

OTHER PUBLICATIONS

Office Action for Japanese Application No. 2010-540933 with English translation, dated Dec. 17, 2013, 6 pages.

Office Action for Japanese Application No. 2010-540933 with English translation, dated May 10, 2013, 21 pages.

Office Action Received for Chinese Patent Application No. 200880125694.4 and English translation, Dated Jun. 18, 2013, 13 pages.

Rose and Clark, "Plasmas and Controlled Fusion", Chapter 15, MIT Press 1961.

Office Action for Russian Application No. 2010126346 with English translation, dated Jun. 26, 2012, 7 pages.

Notice of Reasons for Rejection for Japanese Patent Application No. 2010-540933 with English translation, mail date Jun. 5, 2014, 5 pages.

Notice of Reasons for Rejection for Japanese Patent Application No. 2012-544715 with English translation, mail date Jun. 3, 2014, 8 pages.

Notification of Reasons for Refusal with English translation received in Korean Patent Application No. 10-2010-7016871, dated Nov. 27, 2014, 12 pages.

* cited by examiner

FIG. 12 too long

Additional applications may further include the inspection of welds in submarines and other naval vessels, high caliber ammunition, rocket motor nozzles, missile casings, aircraft structures made from composite materials, composite helicopter blades and rotors, turbines and more.

In some embodiments, the methods according to the invention combine advanced radiographic and inspection techniques with an innovative neutron source described in U.S. application Ser. No. 12/810,958 ("the '958 application"), filed Dec. 29, 2008, titled "High Energy Proton or Neutron Sources," to produce a novel interrogation system. The '958 application is incorporated herein by reference in its entirety. The scanning system may be used to detect or identify a material. The material may be any composition comprising at least one element, the specific element and ratio of elements being indicative of a particular material.

Figure 1:
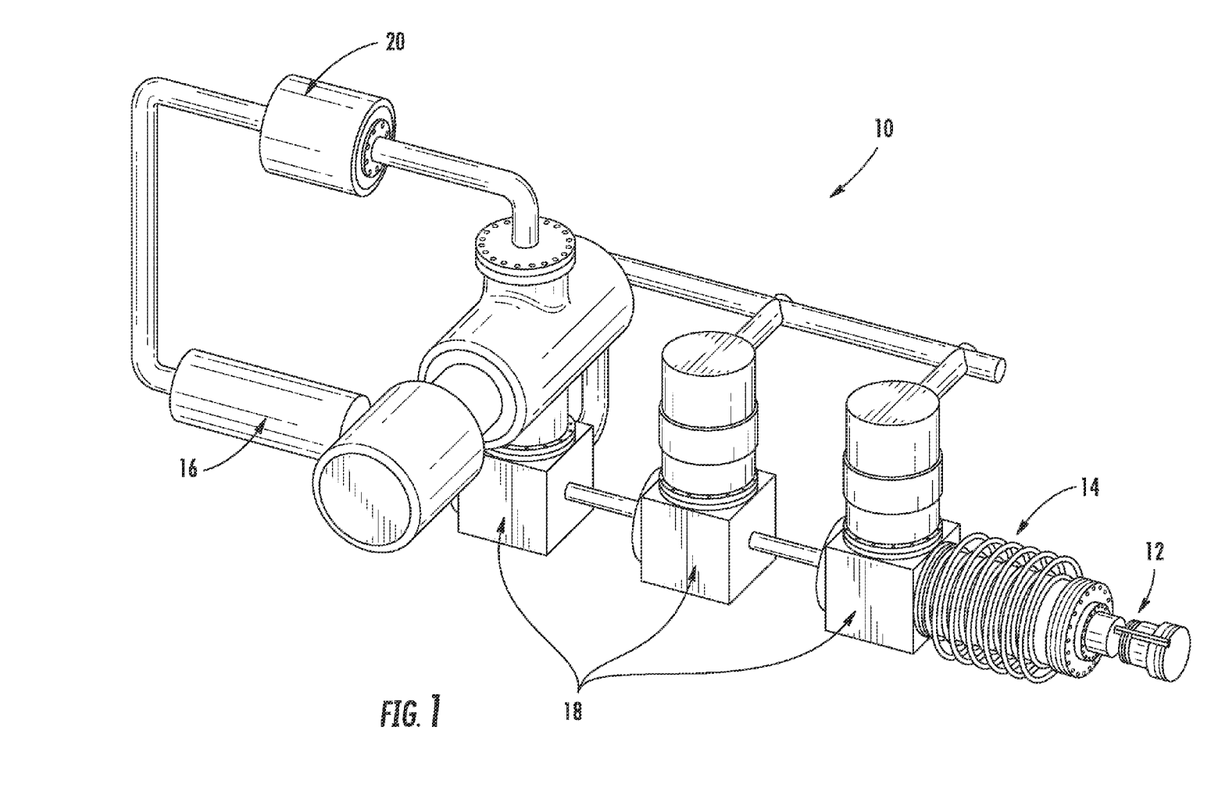

Referring to FIG. 1, the methods of neutron inspection according to some embodiments of the invention are made possible by the use of a high output neutron source 10, as described in the '958 application, which can be thought of as providing "neutron light" (i.e., neutron flux) which is bright enough to create high quality radiographs and a nuclear assay in a short period of time. Neutrons may be created by nuclear reactions typically referred to as nuclear fusion reactions. The neutron source works by creating a modest energy ion flow (e.g., between 100 and 500 keV) of deuterium or tritium particles, and collides it with a gas or plasma target, also including deuterium or tritium particles. One potential embodiment of the neutron source 10 is shown in FIG. 1. The neutron source 10 may utilize a neutron-deriving target that consists of a gas or plasma, instead of a solid. The neutron source 10 may introduce separate spatial regions for acceleration of the ion flow and for collisions of the fast flow with a neutron deriving target.

In more detail, a particular embodiment of the neutron source 10 having an ion source 12, an accelerator 14, and a target chamber 16 may work in the following manner:

The target chamber 16 may be filled with deuterium or tritium gas, in a typical embodiment to a pressure of about 1-10 torr, to provide a target for the ion beam. Other embodiments may utilize different pressures in the target chamber 16.

Deuterium or tritium that leaks from the target chamber 16 towards the accelerator 14 may be pumped into a cold trap 20 by differential pumping stages 18, with each stage 18 reducing the pressure by a factor of between 10 and 1000, keeping the pressure in the accelerator 14 to less than 100 μtorr in an exemplary embodiment.

Gases that enter the cold trap 20 may be cooled to liquid nitrogen temperatures (approximately −196° C.). At this temperature, impurities such as water and atmospheric gases condense and may be removed from the recycled gas stream. The purified gas may be fed from the cold trap 20 back into the target chamber 16. The cold trap 20 may need to be pumped out periodically, such as by way of an automated system.

Deuterium or tritium gas may be fed into an ion source 12, which may be driven to a high positive voltage (typically 100-500 keV) by a power supply. The plasma in the ion source 12 is created by radiofrequency or microwave excitation in an exemplary embodiment. The gas pressure during operation in the ion source 12 may be on the order of a few millitorr (mtorr) in an exemplary embodiment. A high fraction of monoatmoic deuterium (D) or tritium (T) ions ($D^+$ or $T^+$ ions) may be created relative to diatomic ($D_2^+$ or $T_2^+$) and triatomic ($D_3^+$ or $T_3^+$) species because of the high plasma density in the source 12.

At the accelerator end of the ion source 12, a strong voltage gradient may accelerate positive ions from the plasma, creating and shaping an ion flow such that it can pass through the differential pumping stages 18 with minimal loss. Negative particles such as electrons or negative ions may be repelled by the field and are trapped in the ion source 12.

Figure 2:
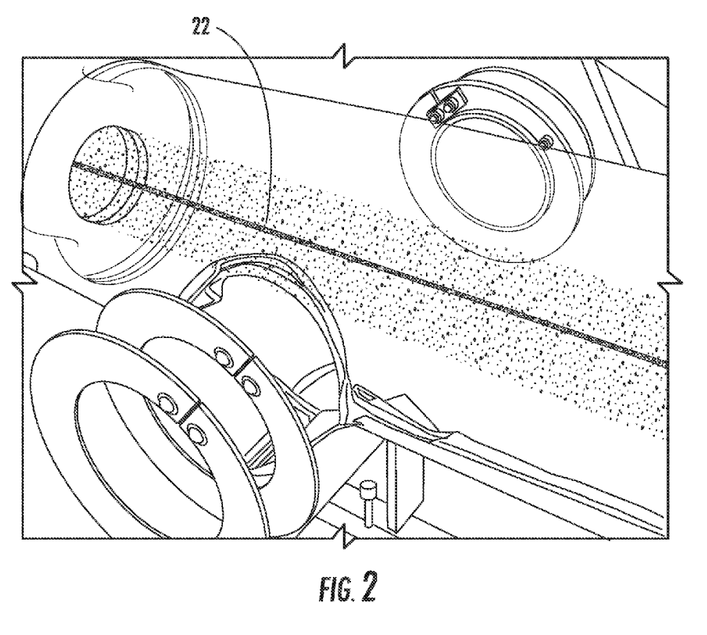

The ion flow enters the accelerator 14 and gains energy as it passes through. The final gap of the accelerator 14 has a small suppression voltage, which may have little effect on the flow, but prevents electrons that might be created in the differential pumping stages 18 or target chamber 16 from flowing back into the accelerator 14, which may waste energy and possibly damage the source 10. FIG. 2 shows an example of the formed and accelerated ion flow 22.

Referring further to FIG. 1, the ion flow then enters the differential pumping section 18 and passes through nearly unaffected.

Figure 3:
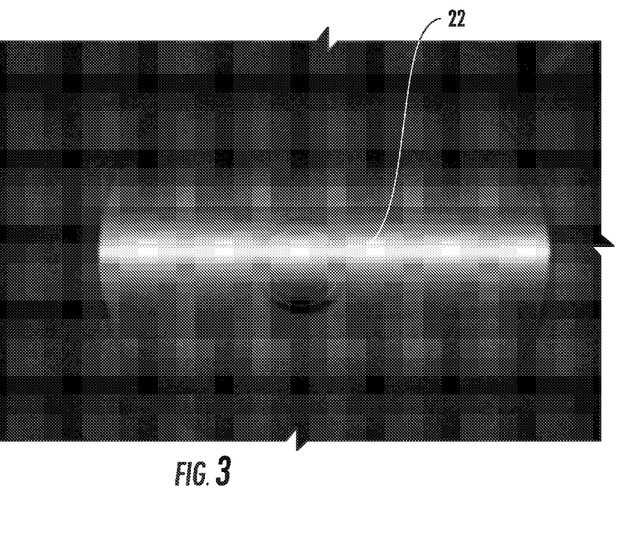

The ion flow then enters the target chamber 16 where it collides with the deuterium or tritium target gas to create neutrons. FIG. 3 shows the ion flow 22 interacting with a target gas.

Figure 4:
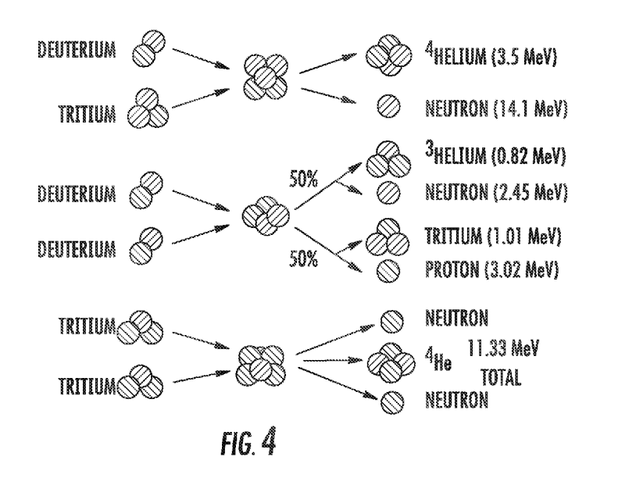

Referring to FIG. 4, the type, yield, and energy of the nuclear reactions may depend on the constituents of the beam as well as the target gas. Classes of reactions for producing neutrons may include reactions occurring between a deuterium flow and a deuterium target (D-D), a deuterium flow and a tritium target (D-T), a tritium flow and a deuterium target (T-D), and a tritium flow and a tritium target (T-T). The reactions between deuterium and tritium nuclei are illustrated in FIG. 4.

The output of the type of neutron source shown in FIG. 1 may be calculated using the thick target yield method. This method assumes that the ion flow is un-attenuated (no particles lost) as it undergoes collisions with the gas until it slows to an energy where it no longer produces significant reactions. The incremental reaction rate for an ion beam impacting a target is given by Equation 1 below, where df(E) is the reaction rate (reactions/s) in the differential energy interval dE, $n_b$ is the target density (particles/$m^3$), is the ion current (A), e is the fundamental charge $1.6022 \times 10^{-19}$ coulombs/particle, σ(E) is the energy-dependent reaction cross-section ($m^2$), and S(E) is the energy-dependent stopping power. Because the particle slows down once inside the target chamber, it may exist at energy E for an infinitesimal step length.

$$df(E) = n_b * \frac{I_{ion}}{e} * \frac{\sigma(E)}{S(E)} * dE$$

$$F(E_i) = \frac{n_b I_{ion}}{e} \int_0^{E_i} \frac{\sigma(E)}{S(E)} dE$$

To determine the thick target yield from a beam stopping in a target, Equation 1 may be integrated over the particle energy from its maximum of $E_i$ to where it stops (Equation 2), where $F(E_i)$ is the total reaction rate for a beam of initial energy $E_i$ stopping in the target.

In an example case in which a monatomic ionized D flow impacts a T gas, at an energy of 350 keV and an intensity of 50 mA, the reaction rate would be approximately $4.6 \times 10^{13}$ reactions/s, and create the same number of neutrons/sec. These same criteria with D-D reactions would yield $6.5 \times 10^{11}$ n/s, and T-T would yield $1.1 \times 10^{12}$ n/s.

In addition to the high source strength permitting a high neutron flux to be delivered into a cargo container for interrogation purposes (e.g., for providing a neutron flux and detecting the resultant radiation signature), methods according to some embodiments of the invention may produce neutrons at steady state (continuous) output, or in short pulses, (e.g., as short as about 10 μsec), which may be useful not only for radiography, but also in specialized detection schemes used for finding nuclear materials.

The neutron source 10 or other embodiments described in the '958 application may be paired with detection techniques including, but not limited to, film based neutron radiography, electronic detector based radiography, nuclear assay, and assay of special nuclear material as described more fully below.

Film based neutron radiography: In this technique, a film with a neutron sensitive film may be used to capture neutron flux or "light" that passes through an object. This technique may be effective at producing detailed images of the interior of light element dominated materials such as modern composites with which x-rays interact only weakly. Additionally, neutrons are more penetrating for heavy element dominated materials, allowing them to provide images of detail found deep inside of metal objects such as thick metal objects such as large caliber ammunition and welds on submarines.

Electronic detector based radiography: This technique works much like film based radiography, only the film is replaced with an array of detectors that are sensitive to neutrons. This allows images to be transmitted directly to a computer screen instead of film.

Figure 5:
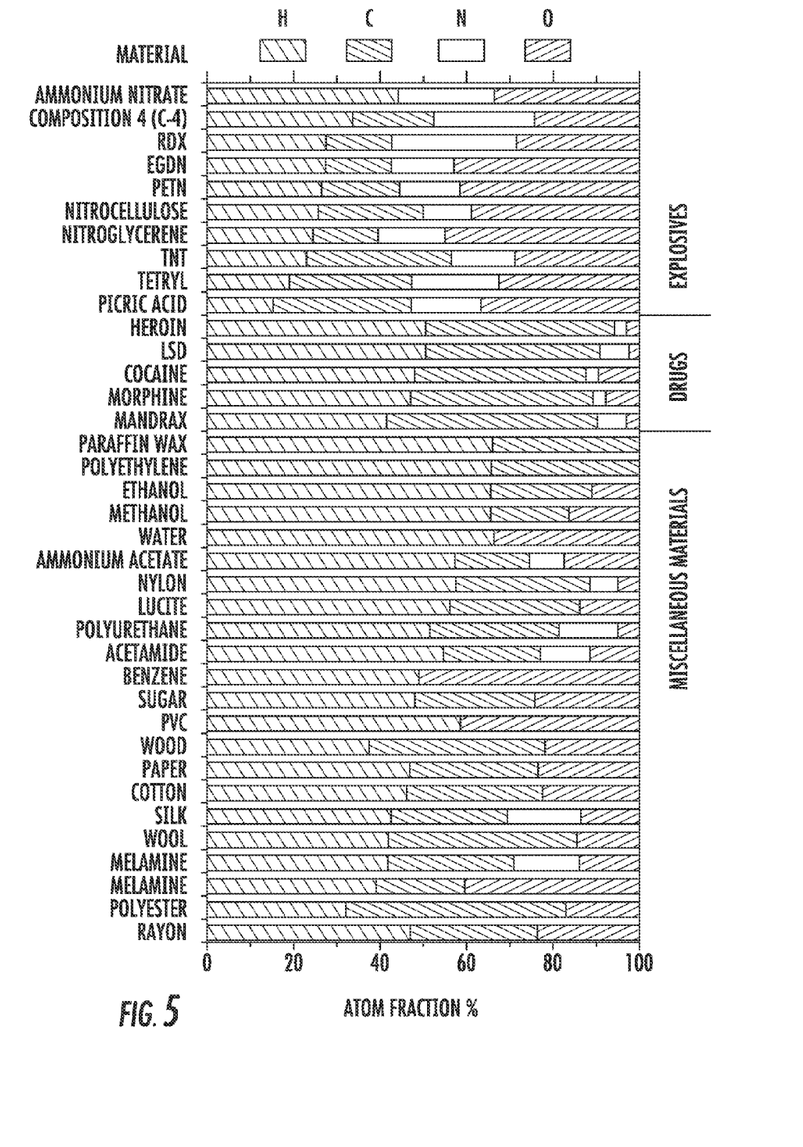

Nuclear assay: This technique uses multiple detector types to detect characteristic radiation signatures emitted by different nuclei. These include neutron, solid state, and scintillation detectors. When bombarded with neutrons, nuclei can end up in an unstable state, and relax by emitting radiation that is unique to that particular nucleus. These radiation emissions can be thought of as colors, with every isotope of every element having its own unique color. This allows for a scanner to determine the precise nuclear makeup of an object. When certain nuclei are present in the right ratios, a determination can be made about the material. FIG. 5 shows an example of several substances that may be identified by the characteristic ratios of hydrogen, carbon, nitrogen, and oxygen.

Assay of special nuclear material: SNM gives off a particularly unique signal that can be used to detect its presence. A detailed discussion of this technique follows.

Neutron based detection of SNM may be extremely sensitive because neutrons may cause the SNM to fission, which creates two detectable signals. The first signal is created by the fission event itself, and the second is from unstable products that are emitted in the fission process. Each of these signals may be detected with a detection method such as differential die away, and delayed neutron assay.

Figure 6:
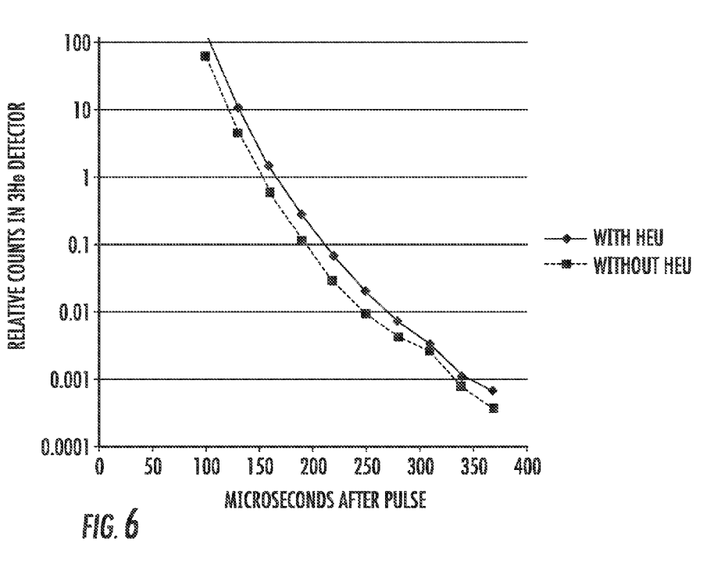
Figure 7:
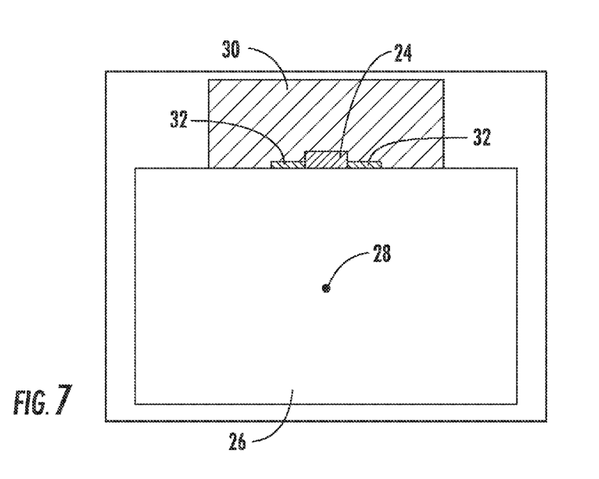

The technique of differential die away analysis is a sensitive method of detecting nuclear materials. By making use of neutron detectors that are shielded from thermal neutrons, fission neutrons may be detected despite the presence of a high thermal neutron population. One way to create a thermal neutron population without the presence of a fast neutron population may be to pulse the neutron source 10 and wait several tens of microseconds. In this time, the fast-epithermal flux from the pulse may "die-away" while the thermal flux remains. The thermal flux can then cause fissions in SNM creating an extended flux of fast neutrons. Because the neutron detectors are shielded from thermal neutrons, they may detect only the neutrons from the fissioning special nuclear material. FIG. 6 shows the falloff of neutron counts in one possible detector configuration for an air filled shipping container with and without highly enriched uranium (HEU) as simulated by MCNP5 (Monte-Carlo Neutral Particle, a software program developed by Los Alamos National Lab to simulate neutron transport and interaction with matter) software. A software program called VisEd may be used to create visual representations of MCNP models and the visual representations of the cases performed with and without HEU. Referring to the FIG. 7 shows a schematic model of the structure of the neutron interrogation system used as the basis for the simulation described with reference to FIG. 6. The neutron source 24 is placed proximate a cargo container 26 holding a small amount of highly enriched uranium 28. A water shield 30 surrounds the neutron source 24 and a number of cadmium wrapped neutron detectors 32 are also placed near the container 26.

In addition to detecting delayed neutrons, gamma signatures resulting from fission can help detect the presence of SNM in certain cargo types. Therefore, scintillation or solid state detectors may also be used to detect gamma rays resulting from fission.

Another technique used for detecting SNM in accordance with an exemplary embodiment is delayed neutron assay. This technique makes use of the fact that fission products are typically neutron rich, causing them to be unstable. To relax, they undergo a series of radioactive decays. Some of these decays form what are known as delayed neutron precursors, which are themselves unstable, and relax by neutron emission. One example is the fission product bromine-87, which beta decays to krypton-87, which sometimes is in a metastable state. The metastable bromine relaxes by emitting a neutron which due to the 54.5 second half life of bromine-87, can be detected well after the interrogating neutron pulse. This example reaction is shown below.

Delayed fission neutrons represent about 0.65 percent of the total number of neutrons produced in the fission of SNM. Although there are dozens of isotopes contributing to the total delayed neutron population, the half-lives of these isotopes can be described using the six groups shown in FIG. 8. Each group has a characteristic half-life and a corresponding relative probability of emission.

Figure 8:
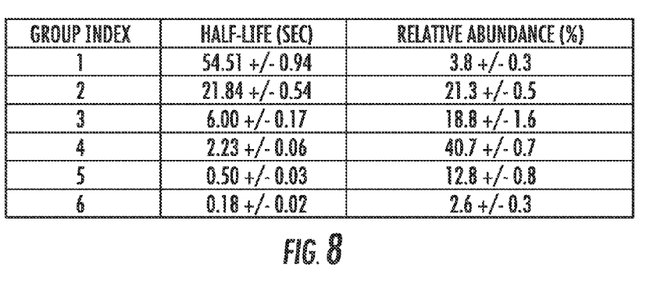
Figure 9:
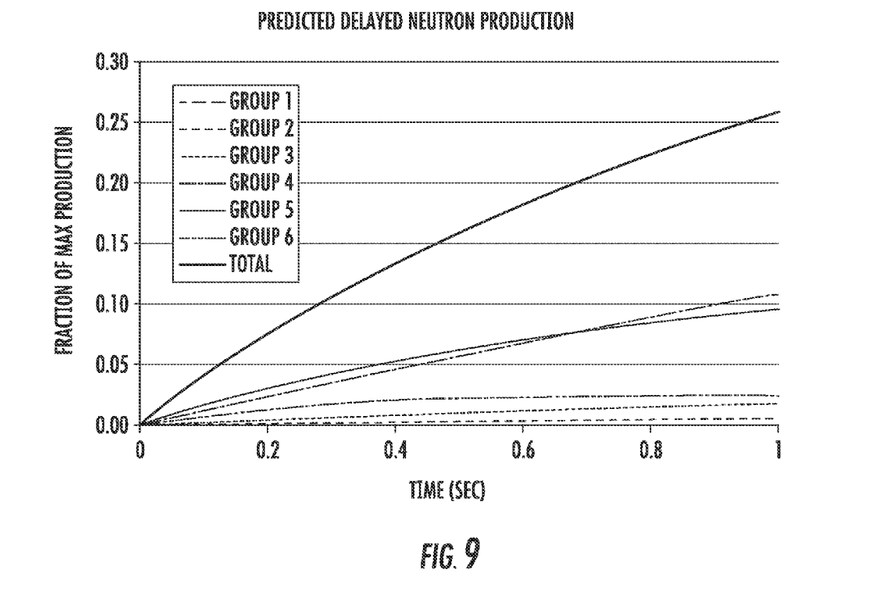
Figure 10:
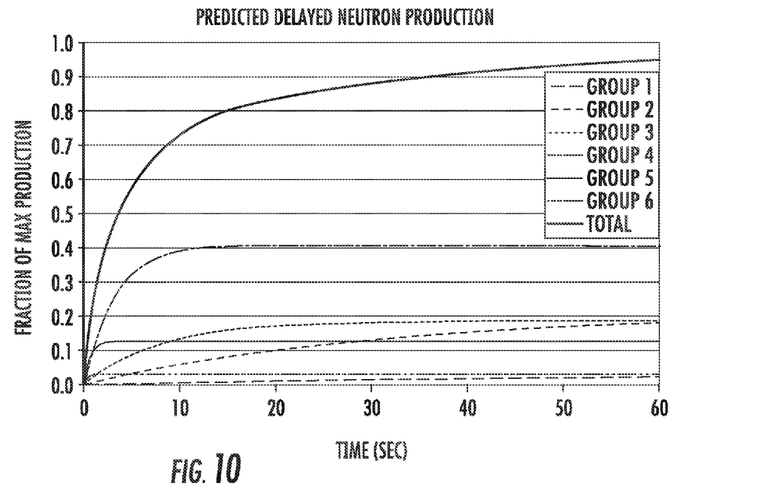
Figure 11:
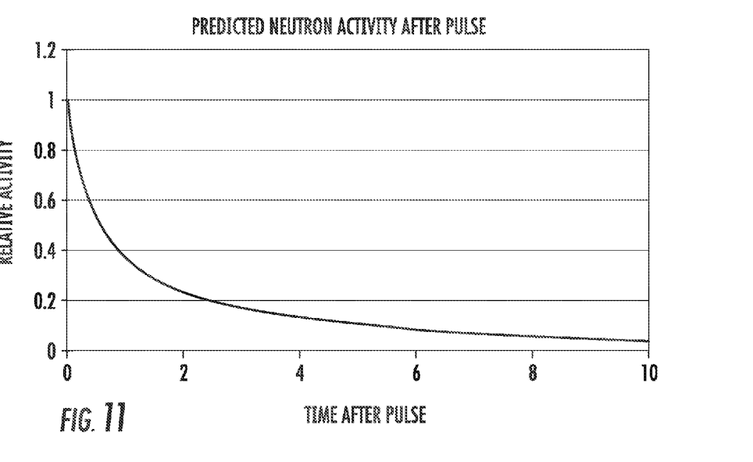

The data points provided in FIG. 8 may be used to calculate the growth and decay of the delayed neutron population during irradiation. FIGS. 9 and 10 show the growth of delayed neutrons during neutron irradiation. After one second, the total population may suitably reach over 25 percent of its steady-state value. However, it may require another 60 seconds of irradiation before reaching 95 percent of its maximum value. When irradiation is stopped, the activity of the delayed neutrons may quickly drop off, as shown in FIG. 11.

For the purpose of quickly interrogating cargo, rather than irradiating for a time period extending much beyond about 70% of saturation, it may be statistically more valuable to start another irradiation. According to some embodiments, the neutron source pulse time may be less than ten seconds, followed by up to about five seconds or so of "listening" with the radiation detectors. According to other embodiments, longer (e.g., between ten seconds and one minute, greater than one minute, etc.) or shorter pulses (e.g., 1-10 μsec, 10-100 μsec, 100-1000 μsec, 1-10 msec, 10-100 msec, 100-1000 msec, etc.) may be used prior to the detection period.

Just as in the differential die away technique, in one of the embodiments of the invention, gamma signatures may also be used for detecting SNM with the delayed neutron assay technique. Short lived fission products may emit delayed gamma rays with a characteristic decay signature present only in special nuclear material.

The detector system used in conjunction with the neutron source 10 may have a similar configuration to other radiation detection systems having one or more detectors. The signals generated by the detection system are provided to suitable electronics configured to provide an indication of the amount and energy of the radiation detected. The electronics can include a processor associated with a computer used to evaluate the data and provide an output. The output can be data regarding the radiation detected, but may also be an image of the contents of the container being scanned (or other structure). The image may be provided by radiation imaging system as is known in the art (e.g., an image reconstruction using conventional techniques). Similarly, the computer system may have software configured to perform other evaluation steps, such as the comparisons used in the nuclear assay technique discussed above.

Figure 12:
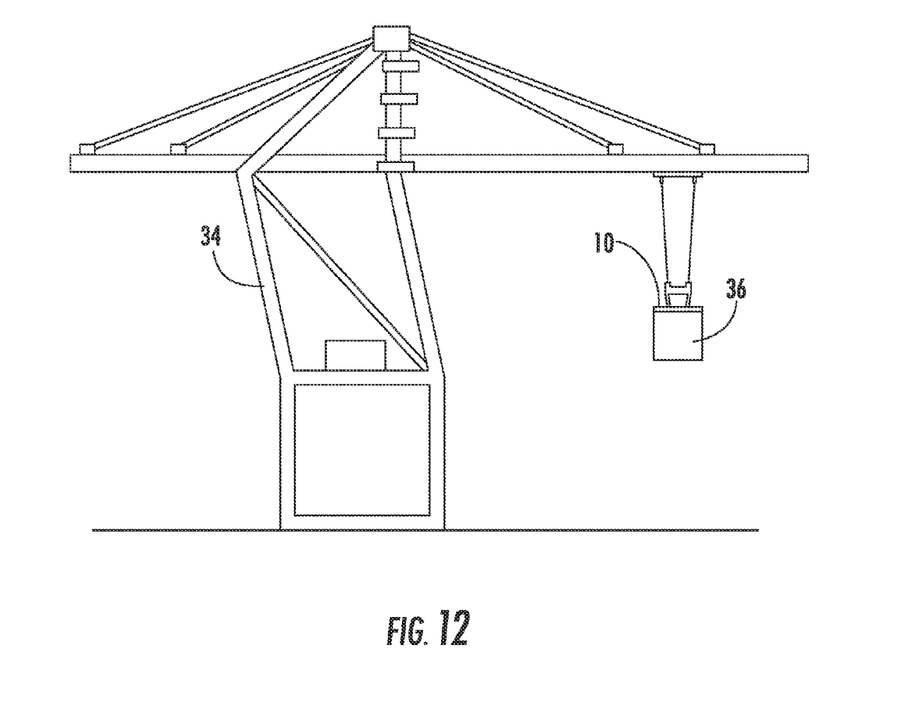

Referring to FIG. 12, the neutron source 10 and detector system can be incorporated into a scanning system for efficiently and non-invasively scanning cargo. In an exemplary embodiment, the neutron source 10 is coupled to a crane 34 used to load or unload intermodal containers 36 to or from cargo ships. The location on the crane 34 presents the advantage of being able to scan the contents of the container while the container 36 is being moved to or from the ship, thereby not disrupting the flow of goods at the port. Further the crane 34 configuration may permit the neutron scan to be performed at a substantial distance from port personnel (e.g., in the air), reducing the amount of radiation shielding required by the overall system. In another embodiment, the same approach may be taken with a intermodal container crane used to load or unload such containers to or from rail cars.

In another embodiment, the container interrogation system (including both the neutron source and detection system) is located on-board a cargo ship or on a conveyor of cargo containers located at a port, airport, etc. In yet another embodiment, the interrogation system is located proximate a train track (e.g., with the neutron source 10 located above the track permitting a train carrying intermodal containers to travel below the neutron source, and the detector located below the track). Such a configuration is intended to permit the efficient scanning of cargo containers on a train (e.g., leaving or entering a shipping port). A similar configuration may be used for the scanning of cargo containers on trucks (e.g., leaving a port, entering a port with containers to load on a ship, at a border crossing, etc.).

When the neutron source and radiation detection system are used in conjunction as an interrogation system to identify material in a cargo container, a method of doing so according to one embodiment of the invention includes first generating a neutron flux with the neutron source. As discussed above, in certain preferred embodiments the neutron flux is generated in a pulsed manner rather than as a steady state flux. The cargo container being interrogated is irradiated with the neutron flux. As discussed above, the materials in the container may react to the neutron flux in a variety of ways, such as by fissioning in the case of special nuclear material. The detector system, which may be one or a variety of detectors as discussed above, is used to detect the radiation signature resulting from the irradiation of the materials in the container. Detecting the radiation signature may include detecting a resultant neutron flux, a resultant gamma flux, detecting the energy of the resultant radiation, and so forth. The radiation detectors may provide the radiation signature data to computing electronics, which may include memory for data storage.

The radiation signature is then evaluated in an effort to identify the material or materials in the container. The evaluating step may include determining the ratio of certain nuclei in the container, such as the ratio of two or more of hydrogen, carbon, nitrogen, and oxygen, and identify the material based upon that ratio. When the neutron source is operated in a pulsed manner, such that a neutron flux of a set duration is provided, the detection step may be performed after the irradiation step, while the neutron flux is not being provided into the container by the neutron source.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show or the description may provide a specific order of method steps, the order of the steps may differ from what is depicted. Also two or more steps may be performed concurrently or with partial concurrence. Such variation will depend on various factors, including software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. An apparatus for inspecting the contents of a cargo container, comprising:
   a neutron source comprising:
      an ion source configured to provide deuterium or tritium ions;
      an accelerator operatively coupled to the ion source to define an accelerator/ion source region, the accelerator operating at a first gas pressure and configured to receive the deuterium or tritium ions and accelerate the deuterium or tritium ions;
      a gaseous target system operatively coupled to the accelerator, the gaseous target system comprising a target chamber operating at a second gas pressure, higher than the first gas pressure, the target chamber holding a target gas comprising at least one of deuterium or tritium; and
      a plurality of differential pumping stages, each stage configured to reduce a pressure in the neutron source by a factor of between 10 and 1000 to maintain a first pressure differential between an outside atmosphere and the ion source/accelerator region, a second pressure differential between the outside atmosphere and the gaseous target system, and a third pressure differential between the ion source/accelerator region and the gaseous target system; and
   a radiation detector;
   wherein the neutron source is configured to deliver a neutron flux into the container and the radiation detector is configured to detect radiation exiting the container subsequent to the delivery of the neutron flux into the container.

2. The apparatus of claim 1, wherein the radiation detector is a neutron sensitive film for imaging the interior of the container.

3. The apparatus of claim 1, wherein the detector is a cadmium wrapped neutron detector.

4. The apparatus of claim 1, wherein the radiation detector is shielded from thermal neutrons.

5. The apparatus of claim 1, wherein the radiation detector is a scintillation or solid state gamma detector.

6. The apparatus of claim 1, wherein the neutron source is configured to provide a steady state neutron flux.

7. The apparatus of claim 1, wherein the neutron source is configured to be pulsed such that the neutron flux is provided for a set period of time.

8. The apparatus of claim 1, wherein the radiation detector is an electronic detector comprising a plurality of neutron detectors configured provide data to a imaging computer for display on a screen or reconstruction into an image.

9. The apparatus of claim 1, wherein the plurality of differential pumping stages are configured to maintain the first gas pressure in the accelerator at less than 100 µtorr.

10. The apparatus of claim 1, wherein the plurality of differential pumping stages are configured to maintain the second gas pressure in a range of about 1-10 Torr.

11. A method of identifying material in a cargo container, comprising:
   generating a neutron flux with a neutron source apparatus comprising:
      an ion source for producing an ion beams;
      an accelerator operatively coupled to the ion source to define an accelerator/ion source region, the accelerator operating at a first gas pressure and configured to receive the ion beam and accelerate the ion beam to yield an accelerated ion beam;
      a gaseous target system operatively coupled to the accelerator, the gaseous target system comprising a target chamber operating at a second gas pressure, higher than the first gas pressure, the target chamber containing a target gas which is reactive with the accelerated beam to emit the neutron flux, wherein the target gas comprises at least one of deuterium or tritium; and
      a plurality of differential pumping stages, each stage configured to reduce a pressure in the neutron source by a factor of between 10 and 1000 to maintain a first pressure differential between an outside atmosphere and the ion source/accelerator region, a second pressure differential between the outside atmosphere and the gaseous target system, and a third pressure differential between the ion source/accelerator region and the gaseous target system;
   irradiating the cargo container with the neutron flux, wherein a radiation signature is produced by the material after the neutron flux contacts the material;
   detecting the radiation signature; and
   evaluating the radiation signature to identify the material.

12. The method of claim 11, wherein the evaluating step comprises determining the ratio of different elements identified in the container.

13. The method of claim 11, wherein the evaluating step comprises detecting a fission event in order to identify special nuclear material in the container.

14. The method of claim 11, wherein the detecting step is performed while the neutron flux is not being provided.

15. The method of claim 11, wherein the detecting step comprises detecting delayed neutrons for the purpose of identifying special nuclear material.

16. The method of claim 11, wherein a evaluating step comprises using a differential die away evaluation for the purpose of identifying special nuclear material.

17. The method of claim 16, wherein the detecting step uses a neutron detector that is shielded from thermal neutrons.

18. The method of claim 17, wherein the irradiating step comprises pulsing the neutron source, and the detecting step is commenced after the irradiating step.

19. The method of claim 11, wherein the detecting step uses a gamma detector and the evaluating step comprises evaluating the gamma signature to identify the material.

20. The method of claim 11, wherein the generating step further comprises maintaining the first gas pressure in the accelerator at less than 100 µtorr via the plurality of differential pumping stages.

21. The method of claim 11, wherein the generating step further comprises maintaining the second gas pressure in a range of about 1-10 Torr via the plurality of differential pumping stages.

22. An apparatus for inspecting the contents of a cargo container, comprising:
   a neutron source comprising:
      an ion source configured to provide deuterium or tritium ions;
      an accelerator operatively coupled to the ion source to define an accelerator/ion source region, the accelerator operating at a first gas pressure and configured to receive the deuterium or tritium ions and accelerate the deuterium or tritium ions;
      a gaseous target system operatively coupled to the accelerator, the gaseous target system comprising a target chamber operating at a second gas pressure, higher than the first gas pressure, the target chamber holding a target gas comprising at least one of deuterium or tritium; and a plurality of differential pumping stages, each stage configured to reduce a pressure in the neutron source by a factor of between 10 and 1000 to maintain a first pressure differential between an outside atmosphere and the ion source/accelerator region, a second pressure differential between the outside atmosphere and the gaseous target system, and a third pressure differential between the ion source/accelerator region and the gaseous target system; and a radiation detector;

wherein the neutron source is configured to deliver a neutron flux into the container and the radiation detector is configured to detect radiation exiting the container subsequent to the delivery of the neutron flux into the container; and wherein the neutron source and radiation detector are coupled to a crane configured to unload cargo containers from a ship.

23. The apparatus of claim 22, wherein the plurality of differential pumping stages are configured to maintain the second gas pressure in a range of about 1-10 Torr.

24. The apparatus of claim 23, wherein the plurality of differential pumping stages are configured to maintain the first gas pressure in the accelerator at less than 100 μtorr.

* * * * *